United States Patent
Schilder et al.

(10) Patent No.: US 12,270,463 B1
(45) Date of Patent: Apr. 8, 2025

(54) ELECTRIC DRIVE SYSTEM FOR A MOTOR VEHICLE

(71) Applicant: MERCEDES-BENZ GROUP AG, Stuttgart (DE)

(72) Inventors: Tobias Schilder, Ludwigsburg (DE); Tobias Haerter, Stuttgart (DE); Jonathan Zeibig, Aalen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/729,220

(22) PCT Filed: Jan. 13, 2023

(86) PCT No.: PCT/EP2023/050737
§ 371 (c)(1),
(2) Date: Jul. 16, 2024

(87) PCT Pub. No.: WO2023/135252
PCT Pub. Date: Jul. 20, 2023

(30) Foreign Application Priority Data

Jan. 17, 2022 (DE) .................... 10 2022 000 149.7

(51) Int. Cl.
*F16H 37/08* (2006.01)
*B60K 17/02* (2006.01)
(Continued)

(52) U.S. Cl.
CPC .......... *F16H 37/082* (2013.01); *B60K 17/02* (2013.01); *F16H 48/08* (2013.01); *F16H 57/021* (2013.01);
(Continued)

(58) Field of Classification Search
CPC ......... F16H 37/082; F16H 2057/02052; B60K 17/02; B60K 17/12; B60K 17/165; B60K 2001/001
See application file for complete search history.

(56) References Cited

U.S. PATENT DOCUMENTS 11,428,318 B2   8/2022  Ooki
11,448,291 B2 * 9/2022  Schlittenbauer .... F16H 63/3416
(Continued)

FOREIGN PATENT DOCUMENTS

DE   102013225519 A1   6/2015
DE   102016215010 A1   2/2018
(Continued)

OTHER PUBLICATIONS

International Search Report and Written Opinion mailed Apr. 17, 2023 in related/corresponding International Application No. PCT/EP2023/050737.
(Continued)

*Primary Examiner* — Huan Le
(74) *Attorney, Agent, or Firm* — PATENT PORTFOLIO BUILDERS PLLC

(57) ABSTRACT

An electric drive system for a motor vehicle includes a housing, an electric motor, a planetary gearbox, and an axle drive. The planetary gearbox has exactly one sun gear and exactly one planetary carrier, which carries a set of first planetary gears and a set of second planetary gears, the first planetary gears have a larger diameter than the second planetary gears. Exactly one ring gear is provided that engages with the second planetary gears. A first freewheel is provided between the ring gear and the housing so that the ring gear is coupled to the housing to block rotation of the ring gear in a forward direction of rotation of the rotor.

8 Claims, 1 Drawing Sheet

(51) Int. Cl.
  *F16H 48/08*   (2006.01)
  *F16H 57/02*   (2012.01)
  *F16H 57/021*  (2012.01)
  *F16H 57/037*  (2012.01)

(52) U.S. Cl.
  CPC . *F16H 57/037* (2013.01); *F16H 2057/02034* (2013.01); *F16H 2057/02052* (2013.01)

(56) References Cited

U.S. PATENT DOCUMENTS

| | | | |
|---|---|---|---|
| 11,524,574 B2 | 12/2022 | Grimminger | |
| 2012/0149520 A1* | 6/2012 | Schneidewind | B60L 15/20 475/296 |
| 2015/0330492 A1* | 11/2015 | Lee | B60K 1/00 475/331 |
| 2017/0057349 A1* | 3/2017 | Ogawa | F16H 57/037 |

FOREIGN PATENT DOCUMENTS

| | | |
|---|---|---|
| DE | 102016223110 B3 | 2/2018 |
| DE | 102018103243 A1 | 8/2019 |
| DE | 102020109112 A1 | 10/2021 |
| WO | 2020183816 A1 | 9/2020 |

OTHER PUBLICATIONS

Office Action created Aug. 23, 2022 in related/corresponding DE Application No. 10 2022 000 149.7.

\* cited by examiner

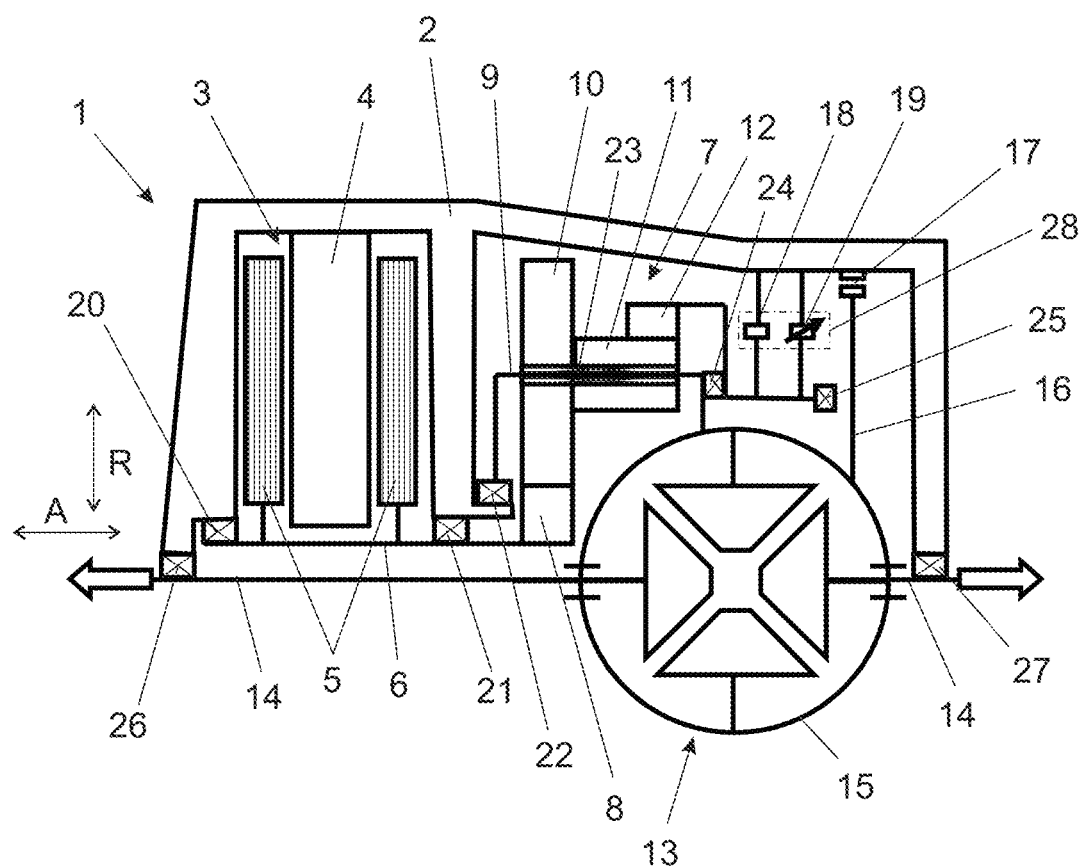

ELECTRIC DRIVE SYSTEM FOR A MOTOR VEHICLE

BACKGROUND AND SUMMARY OF THE INVENTION

Exemplary embodiments of the invention relate to an electric drive system for a motor vehicle having a housing, an electric motor, a planetary gearbox, and an axle drive.

An electric drive system having an electric motor, a planetary gearbox, and an axle drive is known from DE 10 2020 109 112 A1.

A further electric drive system for a vehicle is known in principle from DE 10 2013 225 519 A1. A construction having an electric motor, a planetary gearbox, and an axle drive is described herein, wherein the planetary gearbox has a planetary carrier with two planetary gears, coupled for conjoint rotation, for each of the planets. These mesh with two different ring gears, which can be firmly braked via braking elements relative to a housing of the electric drive system. As a result, two different transmission ratios are achieved between the electric motor on one side and the axle drive on the other side. A similar electric drive system is known from DE 10 2016 223 110 B3 in this field, in which case only one ring gear is provided, which meshes with stepped planetary gears, wherein a freewheel is provided between the ring gear and the housing.

The disadvantage of the two-speed system described above is, in particular, in these shifting and braking elements for the two planetary gears. These must be designed as a multiple disc shifting element, which leads to increased losses in open operation, i.e., when the vehicle is coasting. Ultimately, this causes a higher power requirement of the vehicle itself and thus reduces the range of the vehicle.

Exemplary embodiments of the present invention are directed to an electric drive system that is improved in terms of manufacturing costs and energy consumption.

The electric drive system comprises, similarly to the drive system in the aforementioned prior art, an electric motor with a rotor and with a rotor shaft. Furthermore, the electric drive system comprises a planetary gearbox with exactly one sun gear and exactly one planetary carrier.

On one side the rotor shaft is connected for conjoint rotation to the rotor of the electric motor, and on the other side is connected for conjoint rotation to the exactly one sun gear of the planetary gearbox.

In the context of the present invention, "connected for conjoint rotation" means that the elements or components connected to each other for conjoint rotation are arranged coaxially to each other and are connected to each other in such a way that they rotate with the same angular velocity.

The planetary carrier also carries a set of first planetary gears and a set of second planetary gears here. The first planetary gears and the second planetary gears are each mounted on the planetary carrier in a known manner and can be rotated. The first planetary gears and the second planetary gears have different diameters, wherein the first planetary gears are engaged with the sun gear and the second planetary gears are engaged with a ring gear of the planetary gearbox. The planetary gearbox comprises the ring gear as the only ring gear of the planetary gearbox.

Furthermore, a first freewheel is provided between the ring gear and the housing, by means of which the ring gear can be coupled to the housing in such a way that a rotation of the ring gear is blocked with a forward traction mode of the electric drive system. In other words, the first freewheel is designed to connect the ring gear to the housing in a forward traction mode of the electric drive system. The first freewheel between the ring gear and the housing can therefore only transmit traction torques of the electric motor to the input shaft of the axle drive in its motor mode with a positive direction of rotation, so that the motor vehicle can be driven in a forward direction. In a forward overrun mode, the ring gear is automatically uncoupled from the housing during the first freewheel and is then automatically recoupled when changing from forward overrun mode to forward traction mode.

The construction is extremely simple and efficient and can ensure that the electric motor can transmit torque to the axle drive in the forward direction of rotation without the need for an actuator. In a forward overrun mode, i.e., when a power flow runs from the axle drive in the direction of the electric motor, this must then not be coupled however, but is automatically decoupled by the first freewheel, so that coasting is possible in the region of the electric drive system without additional power loss, which in general increases the performance and the efficiency of the electric drive system. This results in a greater range for a vehicle equipped with such an electric drive system as the main drive or additional drive.

Due to the decoupling in the thrust via the first freewheel, no reverse travel with motor mode of the electric motor in the negative direction of rotation and no recuperation with regenerative mode of the electric motor is possible.

According to the invention it is provided that a second freewheel is arranged between the ring gear and the housing, by means of which the ring gear can be coupled to the housing in such a way that a rotation of the ring gear is blocked with the forward overrun mode of the electric drive system. This freewheel now functions in the forward overrun mode and not in the forward traction mode. In the forward traction mode of the electric drive system, the electric motor functions via the first freewheel, which opens in the forward overrun mode. Simultaneously, in the forward overrun mode a connection is created via the second freewheel, which automatically opens in the forward traction mode, so that on one hand reversing is possible and on the other hand recuperation is possible.

In order to not lose the above-mentioned advantage of the loss-free or low-loss coasting, it is thus provided according to the invention that the second freewheel is designed to be switchable. In the meaning of the invention, switchable with the second freewheel means that the blocking function of the second freewheel can be switched on and off. In the switched-on state the second freewheel has a blocking effect on the ring gear when the electric drive system is in the forward overrun mode. In the switched-on state the second freewheel does not have a blocking effect on the ring gear when the electric drive system is in the forward traction mode.

In the switched-off state, the blocking function of the second freewheel is then suspended, the second freewheel is thus deactivated and the ring gear can rotate freely also in the forward overrun mode. By switching off the second freewheel, the blockade originating from it in the forward overrun mode can be released. This means that loss-free coasting is still possible in the forward overrun mode with a vehicle equipped with the electric drive system. If recuperation is now required or reversing is necessary, such operation can be easily and efficiently enabled by switching on the second freewheel so that its blocking function is switched on again.

Forward traction mode means that the electric drive system is operated in such a way that drive torques of the electric motor are transmitted from the rotor to the input shaft of the axle drive for forward travel of the motor vehicle.

Forward overrun mode means that the electric drive system is operated in such a way that torques exerted on the input shaft of the axle drive from wheels of the motor vehicle during forward operation of the motor vehicle are greater than torques exerted on the input shaft of the axle drive from the rotor.

According to a further very advantageous embodiment of the electric drive system according to the invention, it can be provided that the second planetary gears are arranged axially overlapping with the axle drive. Such an arrangement axially overlapping with the axle drive, so that the second planetary gears are at least partially located within the same area when viewed in the axial direction of the electric drive system, enables a very compact design in the axial direction.

For the purposes of the present invention, the axial direction should always be understood as the axial direction along or parallel to the main axis of rotation of the electric drive system, in this case parallel to the axis of rotation of the rotor shaft. The radial direction as described here is perpendicular to this axial direction.

Another extraordinarily favorable embodiment of the electric drive system can provide that the axle drive has a bevel gear differential with a differential cage. This differential cage, which can also be referred to as the differential housing, forms the differential input shaft. Particularly with this axle drive design, the axial overlap with the second planetary gears, i.e., the smaller-diameter planetary gears on the planet carrier, can achieve a particular installation space advantage.

A particularly favorable embodiment of the electric drive system provides a first axial bearing by means of which the ring gear is supported axially relative to the planet carrier. This also serves to make the design as compact as possible both axially and radially.

According to a further very advantageous embodiment, a further first radial bearing can be provided, by means of which the planetary carrier is supported radially by the housing, wherein a planetary-carrier-side bearing half of the first radial bearing is arranged radially outside a housing-side second bearing half. The planet carrier is therefore supported via the first radial bearing from the radial outside on a part of the housing that is arranged radially further inwards, e.g., an axially protruding collar of a housing intermediate wall.

A further embodiment of the electric drive system can also provide for a second axial bearing by means of which the ring gear is supported axially relative to either a parking gear or the housing. Such a support, for example on the parking gear, which is typically non-rotatably connected to the input shaft of the axle drive, or alternatively also directly on this input shaft or a flange of this input shaft, allows a very compact design. However, because the relative movements occurring between the input shaft and the ring gear are comparatively large, it can also be advantageous from a loss perspective to alternatively support the ring gear on the housing with the second axial bearing, so that both variants have their advantages, depending on the optimization purpose.

The parking gear, which is typically connected to the input shaft of the axle drive for conjoint rotation, can then be firmly braked or connected for conjoint rotation to the housing via a switching element. This allows the axle drive to be blocked and prevents the output shaft and the wheels of the motor vehicle from rotating.

According to an extraordinarily favorable development of the electric drive system according to the invention, the rotor shaft can be supported via combination bearings, for which purpose a first combination bearing and a second combination bearing are provided, each of which is designed to provide axial and radial support of the rotor shaft relative to the housing. For both the first combination bearing and the second combination bearing, the respective bearing half on the rotor shaft side is arranged radially inside the respective bearing half on the housing side. The rotor shaft is therefore supported on parts of the housing, e.g., radially extending intermediate walls of the housing, which lie radially outside the rotor shaft.

Both freewheels can be combined in a single assembly according to an extraordinarily favorable development of the electric drive system. In particular, such an assembly can be arranged between the axle drive and the housing and would therefore be easily accessible from the outside of the housing, especially in order to install the actuators in the case of the switchable freewheel. In principle, a shift function would of course also be possible with the first freewheel. However, this is no longer relevant in practice, so that it is typically omitted for cost reasons.

The electric motor is particularly preferably realized as an axial flow machine.

Further advantageous embodiments of the electric drive system can also be found in the exemplary embodiment which is presented in more detail below with reference to the FIGURE.

BRIEF DESCRIPTION OF THE SOLE DRAWING

The sole drawing shows a schematic sectional view of an electric drive system according to the invention.

DETAILED DESCRIPTION

The sole drawing schematically illustrates an electric drive system 1 for a motor vehicle (not shown). The electric drive system 1 comprises a housing 2 and an electric motor 3 with a stator 4, which is held non-rotatably relative to the housing 2, and a rotor 5, which can rotate relative to the stator 4 and is in turn connected to a rotor shaft 6 for conjoint rotation.

The electric drive system 1 also comprises a planetary gearbox 7 with a sun gear 8, which is non-rotatably connected to the rotor shaft 6, and a planet carrier 9, which carries a set of first planet gears 10 and a set of second planet gears 11. The first planetary gears 10 have a larger diameter than the second planetary gears 11. The adjacent first and second planetary gears 10, 11 are each coupled to each other for conjoint rotation. The second planetary gears 11, which have a smaller diameter than the first planetary gears 10, mesh with a ring gear 12 of the planetary gearbox 7.

In addition, the electric drive system 1 has an axle drive 13, which is designed here as a bevel gear differential. An output shaft 14 of the axle drive 13 forms the output indicated by the arrows, in particular to the wheels of the motor vehicle. The differential cage 15 forms the input shaft 15 of the axle drive 13 and is coupled for conjoint rotation to the planet carrier 9. The differential cage 15 can also be fixed against rotation relative to the housing 2 via a parking gear 16 and a corresponding switching element 17 in order to realize a parking lock for the motor vehicle.

The structure shown here with the one ring gear 12 of the planetary gearbox 7 therefore ultimately represents a singlespeed system for driving or at least partially driving the motor vehicle via the electric drive system 1.

The ring gear 12 of the planetary gearbox 7 is now coupled to the housing 2 of the electric drive system 1 via a first freewheel 18 in such a way that rotation of the ring gear 12 in a forward direction of rotation of the rotor 5 is prevented. The first freewheel 18 therefore only transmits traction torques of the electric motor 3 to the output shaft 14, while in overrun mode the first freewheel 18 automatically rotates freely and thus decouples the electric motor 3 via a release of the ring gear 12 of the planetary gearbox 7. This enables overrun mode without coupling of the electric motor 3, which enables efficient and low-loss operation of the electric drive device 1 when the vehicle is coasting, i.e., rolling without drive. If a change is made from thrust to traction again, the first freewheel 18 closes automatically and the power of the electric motor 3 can be transmitted to the output 14 again.

With the first freewheel 18 alone, it would not be possible to realize recuperation, nor would it be possible to reverse the motor vehicle via the electric motor 3, as this would require power transmission between the output 14 and the electric motor 3 in the opposite direction, i.e., the direction of thrust. To make this possible, an additional second freewheel 19 is now provided between the ring gear 12 and the housing 2. This freewheel 19 is designed in such a way that it can transmit torques in overrun mode but not in traction mode. It therefore supplements the first freewheel 18 accordingly, so that recuperation and reversing are now possible. The second freewheel 19 is switchable. By switching this second freewheel 19, which is indicated by the arrow in the illustration in FIG. 1, the blocking function can be switched on or off, so that the second freewheel 19 either operates as a freewheel 19 blocking in thrust as described or can be switched to a freewheel 19 that is free in both thrust and traction, so that, depending on the switch position of this second freewheel 19, either recuperation or reversing is possible, while, when the blocking function is switched off, coasting is possible without coupling of the electric motor 3.

The combination of the two freewheels 18, 19, of which the second freewheel 19 is switchable, therefore enables a permanent connection in one direction and a switchable connection in the other direction of rotation or force. The two freewheels 18, 19 can preferably be combined to form an integrated unit 28, which is arranged in particular in radial direction R outside the differential cage 15 but axially overlapping with it. The structural unit is preferably easily accessible from the outside of the housing 2, in particular in order to be able to actuate the switching actuator of the second freewheel 19 easily and efficiently, for example by means of a hydraulic line, an electrical signaling line and/or the like.

Overall, the design can be realized in an extremely compact way. Not only the integrated unit 28 with the two freewheels 18, 19 can be designed to overlap with the final drive 13 or its differential cage 15 in the axial direction A of the output shaft 14 or the rotor shaft 6, but in particular also the set of second planetary gears 11 and preferably the ring gear 12. All this results in a very compact design, especially in the axial direction A.

The electric motor 3, which can be designed in particular as an axial flow machine, can be supported on the housing 2 with respect to its rotor shaft 6 via a first combination bearing 20 and a second combination bearing 21, wherein the rotor shaft 6 is arranged radially inside and the housing is arranged radially outside the two combination bearings 20, 21. The combination bearings can transmit both axial and radial forces, i.e., they are a combination of axial and radial bearings. In particular, these can be angular contact ball bearings, four-point contact ball bearings or similar.

The planetary carrier 9 of the planetary gearbox 7 can then also be supported on the housing 2 via a first radial bearing 22, wherein the housing 2 is arranged radially inside and the planetary carrier 9 is arranged radially outside this first radial bearing 22. A second radial bearing 23 can then be used in the area of the planetary carrier 9 to support the two first and second planetary gears 10, 11 of the respective set of planetary gears, which are connected to each other for conjoint rotation.

The ring gear 12 can preferably be supported in axial direction A against the planetary carrier 9 via a first axial bearing 24. A second axial bearing 25 can be used to support the ring gear 12 and the freewheels 18, 19 connected to it in the other axial direction A. Depending on the design, this axial bearing 25, which is shown without an actual counterpart in the illustration in FIG. 1, can now be supported either on the parking gear 16, which results in a very compact design, or alternatively on the housing 2, which results in a somewhat larger design, but is advantageous in terms of losses.

The axial bearings 24, 25 can be designed, in particular, as axial needle roller bearings, and the radial bearings 22, 23, in particular, as cylindrical roller bearings or deep groove ball bearings, as is generally known and customary.

Further relevant bearing points in the structure of the electric drive system 1 are now located in the area of the output shaft 14, wherein a radial bearing 26 is arranged on the left in the illustration of FIG. 1 and a combination bearing 27, which can therefore transmit axial and radial forces, is arranged on the right in the illustration of FIG. 1. In these, the radially inner output shaft 14 is supported on the radially outer housing 2.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURE enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. An electric drive system for a motor vehicle, the electric drive system comprising:
    a housing;
    an electric motor comprising a rotor connected to a rotor shaft to conjointly rotate;
    a planetary gearbox, wherein the planetary gearbox comprises exactly one sun gear and exactly one planetary carrier, wherein the planetary carrier carries a set of first planetary gears and a set of second planetary gears, wherein the first planetary gears have a larger diameter than the second planetary gears, wherein each one of the first planetary gears and each one of the second planetary gears are connected to each other to conjointly rotate, wherein the sun gear is engaged with the first planetary gears, wherein the rotor shaft is connected to the sun gear to conjointly rotate;

an axle drive, wherein the planetary carrier is connected to an input shaft of the axle drive to conjointly rotate;

exactly one ring gear, which is engaged with the second planetary gears;

a first freewheel arranged between the ring gear and the housing, wherein the first freewheel is configured to couple the ring gear to the housing to conjointly rotate when the electric drive system is operated in a forward traction mode;

a second freewheel arranged between the ring gear and the housing, wherein the second freewheel is configured to be switchable and is to couple the ring gear to the housing to conjointly rotate when the electric drive system is operated in a forward overrun mode and when the second freewheel is in a switched-on state; and a first axial bearing configured so that the ring gear is axially supported by the planetary carrier.

2. The electric drive system of claim 1, wherein the second planetary gears are arranged axially overlapping the axle drive.

3. The electric drive system of claim 1, wherein the axle drive has a bevel gear differential with a differential cage as the input shaft.

4. The electric drive system of claim 1, further comprising:
a first radial bearing configured so that the planetary carrier is radially supported by the housing, wherein a planetary-carrier-side bearing half of the first radial bearing is arranged radially outside a housing-side second bearing half of the first radial bearing.

5. The electric drive system of claim 4, further comprising:
a second axial bearing configured so that the ring gear is supported axially by a parking gear or the housing.

6. The electric drive system of claim 5, further comprising:
a first combination bearing; and
a second combination bearing,
wherein the first and second combination bearings are respectively configured to axially and radially support the rotor shaft by the housing, with the respective assigned rotor-shaft-side bearing half being arranged radially inside the respective housing-side bearing half for both the first combination bearing and the second combination bearing.

7. The electric drive system of claim 1, wherein the first and second freewheels are combined in one assembly.

8. The electric drive system of claim 1, wherein the electric motor is an axial flow machine.

* * * * *